United States Patent
Kurian

(10) Patent No.: US 10,158,703 B2
(45) Date of Patent: Dec. 18, 2018

(54) RESOURCE ALLOCATION AND TRANSFER UTILIZING HOLDS AND A DISTRIBUTED NETWORK

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 252 days.

(21) Appl. No.: 15/179,702

(22) Filed: Jun. 10, 2016

(65) Prior Publication Data
US 2017/0359408 A1    Dec. 14, 2017

(51) Int. Cl.
*H04L 29/08* (2006.01)
*H04L 12/911* (2013.01)
*G06Q 40/00* (2012.01)

(52) U.S. Cl.
CPC ............. *H04L 67/10* (2013.01); *G06Q 40/00* (2013.01); *H04L 47/70* (2013.01); *H04L 47/72* (2013.01); *H04L 47/746* (2013.01)

(58) Field of Classification Search
CPC ......... H04L 67/10; H04L 47/72; H04L 47/70; H04L 47/746; G06Q 40/00
USPC ........................................................ 709/226
See application file for complete search history.

(56) References Cited

U.S. PATENT DOCUMENTS

| | | | |
|---|---|---|---|
| 8,271,394 B1* | 9/2012 | Bogaard | G06Q 20/12 705/64 |
| 8,880,687 B1* | 11/2014 | Chandrachari | H04L 43/065 709/224 |
| 9,871,694 B1* | 1/2018 | Walavalkar | H04L 41/0803 |
| 2002/0086661 A1* | 7/2002 | Rouse | H04M 3/493 455/412.1 |
| 2002/0087620 A1* | 7/2002 | Rouse | H04M 3/493 709/203 |
| 2004/0064405 A1* | 4/2004 | Weichert | G06Q 20/04 705/39 |
| 2004/0122766 A1* | 6/2004 | Brooks | G06Q 20/102 705/40 |
| 2007/0226122 A1* | 9/2007 | Burrell | G06Q 20/3821 705/37 |
| 2008/0120129 A1* | 5/2008 | Seubert | G06Q 10/06 705/35 |
| 2009/0089788 A1* | 4/2009 | Turner | G06F 9/52 718/104 |
| 2010/0070397 A1* | 3/2010 | Hahn-Carlson | G06Q 10/06 705/34 |
| 2010/0161566 A1* | 6/2010 | Adair | G06F 17/30536 707/690 |

(Continued)

*Primary Examiner* — David R Lazaro
*Assistant Examiner* — Berhanu Shitayewoldetadik
(74) *Attorney, Agent, or Firm* — Michael A. Springs; Moore & Van Allen PLLC; Nicholas C. Russell

(57) ABSTRACT

Embodiments of the present invention provide utilizing a distributed network of systems for allocating and transferring resources between entities (e.g., users, institutions, or the like) by providing holds (e.g., soft or hard) on the resources, allocating the resources, and transferring the resources by utilizing allocation identifiers and/or holding pools, if needed. The use of allocation identifiers and/or holds on the resources improves upon the processing speeds and power of systems used for the resource transfers between entities.

19 Claims, 4 Drawing Sheets

(56) References Cited

U.S. PATENT DOCUMENTS

| | | | | |
|---|---|---|---|---|
| 2011/0106840 A1* | 5/2011 | Barrett | ............... | G06Q 30/02 |
| | | | | 707/769 |
| 2013/0054457 A1* | 2/2013 | Strickland | ............ | G07F 15/005 |
| | | | | 705/44 |
| 2013/0204788 A1* | 8/2013 | Dorsey | ............. | G06Q 20/3226 |
| | | | | 705/44 |
| 2015/0379488 A1* | 12/2015 | Ruff | .................. | G06Q 20/108 |
| | | | | 705/36 R |
| 2016/0307081 A1* | 10/2016 | Wurmfeld | ......... | G06K 19/0772 |
| 2016/0321752 A1* | 11/2016 | Tabacco | ................ | G06Q 40/04 |
| 2016/0342959 A1* | 11/2016 | Thomas | ............ | G06Q 20/027 |
| 2016/0342983 A1* | 11/2016 | Thomas | ............ | G06Q 20/401 |
| 2016/0342985 A1* | 11/2016 | Thomas | ............ | G06Q 20/401 |
| 2016/0342986 A1* | 11/2016 | Thomas | ............ | G06Q 20/401 |
| 2016/0342987 A1* | 11/2016 | Thomas | ............ | G06Q 20/401 |
| 2016/0342988 A1* | 11/2016 | Thomas | ............ | G06Q 20/401 |
| 2017/0103385 A1* | 4/2017 | Wilson, Jr. | ......... | G06Q 20/401 |
| 2017/0301032 A1* | 10/2017 | Turner | ................ | G06Q 50/22 |

* cited by examiner

US 10,158,703 B2

RESOURCE ALLOCATION AND TRANSFER UTILIZING HOLDS AND A DISTRIBUTED NETWORK

FIELD

The present invention relates to utilizing a distributed network and resource holds for facilitating the allocation and transfer of resources. More particularly, the present invention relates to allocating and transferring resources using resource holds in a way that improves the operation of the systems over the distributed network.

BACKGROUND

Resource allocation and transfer between entities can be a complicated process. Depending on the processing of the resource allocation and transfer, the resources may be allocated for transfers when the resources are not available. Accordingly, there exists a need to facilitate the allocation of resources between entities.

BRIEF SUMMARY

Embodiments of the present invention address these and/or other needs by providing an innovative system, method and computer program product for allocating and transferring resources between entities (e.g., users, institutions, or the like) by providing holds (e.g., soft or hard) on the resources, allocating the resources, and transferring the resources by utilizing allocation identifiers and/or holding pools, if needed. By allocating the resources at the time of the resource transfer request, the systems may be able to improve upon the speed of resource transfers such that when the confirmation of the resource transfer is received the transfer may be made and the resource transfer systems are not required to verify the resource pools to determine if the resources are available. As such, the resource transfer systems only have to inquire as to the resources in the resource pools once, instead of multiple times. This process greatly reduces the processing times and computer power for processing the resource transfers.

Embodiments of the invention comprise systems, methods, and computer products for facilitating electronic resource allocation and transfer between a user and an entity through the use of a distributed network of systems. The invention includes electronically receiving a transfer request for resources from a user to an entity, wherein the request for the resource transfer is received from an entity system associated with the entity, and wherein the transfer request from the entity includes a placeholder resource amount. The invention includes electronically receiving an allocation request from the user related to the transfer request, wherein the allocation request is received from a user device, and wherein the allocation request includes the allocation resource amount for the transfer request. The invention further includes electronically determining when a user resource pool has resource amounts that satisfy the allocated resource amount for the resource transfer. The invention includes electronically placing a hold on the resources in the user resource pool by identifying the resources as allocated resources. The invention includes electronically receiving confirmation of the actual resource amount for the resource transfer, wherein confirmation is received from the entity systems or resource transfer systems. The invention further includes electronically finalizing the resource transfer when the allocated resource amount covers the actual resource amount by transferring the allocated resources to an entity resource pool, wherein the allocated resources are transferred through the entity systems or the resource transfer systems.

When the hold is a soft hold, aspects of the invention include electronically associating an allocation identifier with the allocated resources. The allocation identifier at least includes the allocation resource amount for the allocated resources for the transfer request. Moreover, finalizing the resource transfer comprises deleting the allocation identifier.

The invention further includes electronically receiving one or more additional resource transfer requests for one or more additional resource transfers; electronically determining when the user resource pool fails to have the resource amounts for the one or more additional resource transfers; and electronically rejecting at least one of the one or more additional resource transfer requests.

The invention further comprises electronically notifying the user that the resource pool fails to satisfy the one or more additional resource transfer requests; electronically receiving an adjustment in the allocated resources for the resource transfer or for the one or more additional resource transfers; and rejecting the resource transfer or the one or more additional resource transfers based on the adjustment received from the user.

When the hold is a hard hold, aspects of the invention include electronically transferring the allocated resources from the user resource pool to a holding pool.

When the holding pool is a dedicated holding pool linked with the user resource pool, the invention further includes electronically associating an allocation identifier with the allocated resources in the holding pool. The allocation identifier at least includes the allocation resource amount for the resources for the transfer request. The invention further includes that finalizing the resource transfer comprises transferring the allocated resources from the holding pool to the entity resource pool and deleting the allocation identifier.

When the holding pool is a temporary holding pool, aspects of the invention include electronically creating the temporary holding pool; electronically linking the temporary holding pool with the user resource pool; and electronically transferring the allocated resources from the user resource pool to the temporary holding pool. The invention further includes that finalizing the resource transfer includes transferring the allocated resources from the temporary holding pool to the entity resource pool and unlinking the temporary holding pool or deleting the temporary holding pool.

The invention further comprises that the allocated resources transferred from the user resource pool to the holding pool is a permanent transfer unless the transfer request is canceled.

The invention further comprises that the allocated resources transferred from the user resource pool to a holding pool is a revocable transfer.

The invention further includes electronically determining when the allocated resource amount is less than the actual resource amount; electronically determining when at least a portion of the resources in the user resource pool and the allocated resources satisfies the actual resource amount; and electronically transferring at least the portion of the resources in the user resource pool and the allocated resources to the entity resource pool.

The invention further comprises electronically determining when the allocated resource amount is less than the actual resource amount; electronically determining when at least a portion of the resources in the user resource pool and the allocated resources do not satisfy the actual resource amount; and electronically canceling the resource transfer request.

The invention further comprises that when the allocated resource amount is greater than the actual resource amount the difference is returned to the user resource pool.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
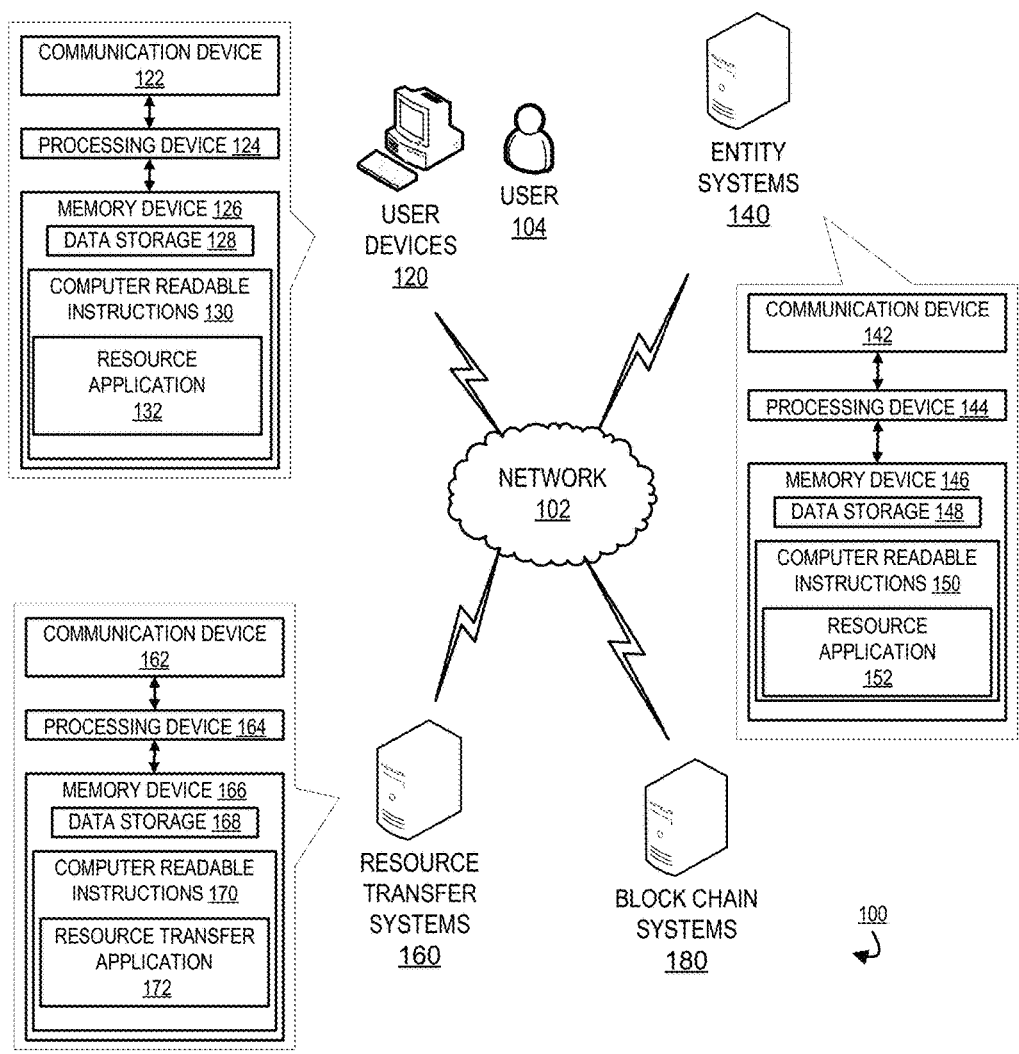
Figure 2:
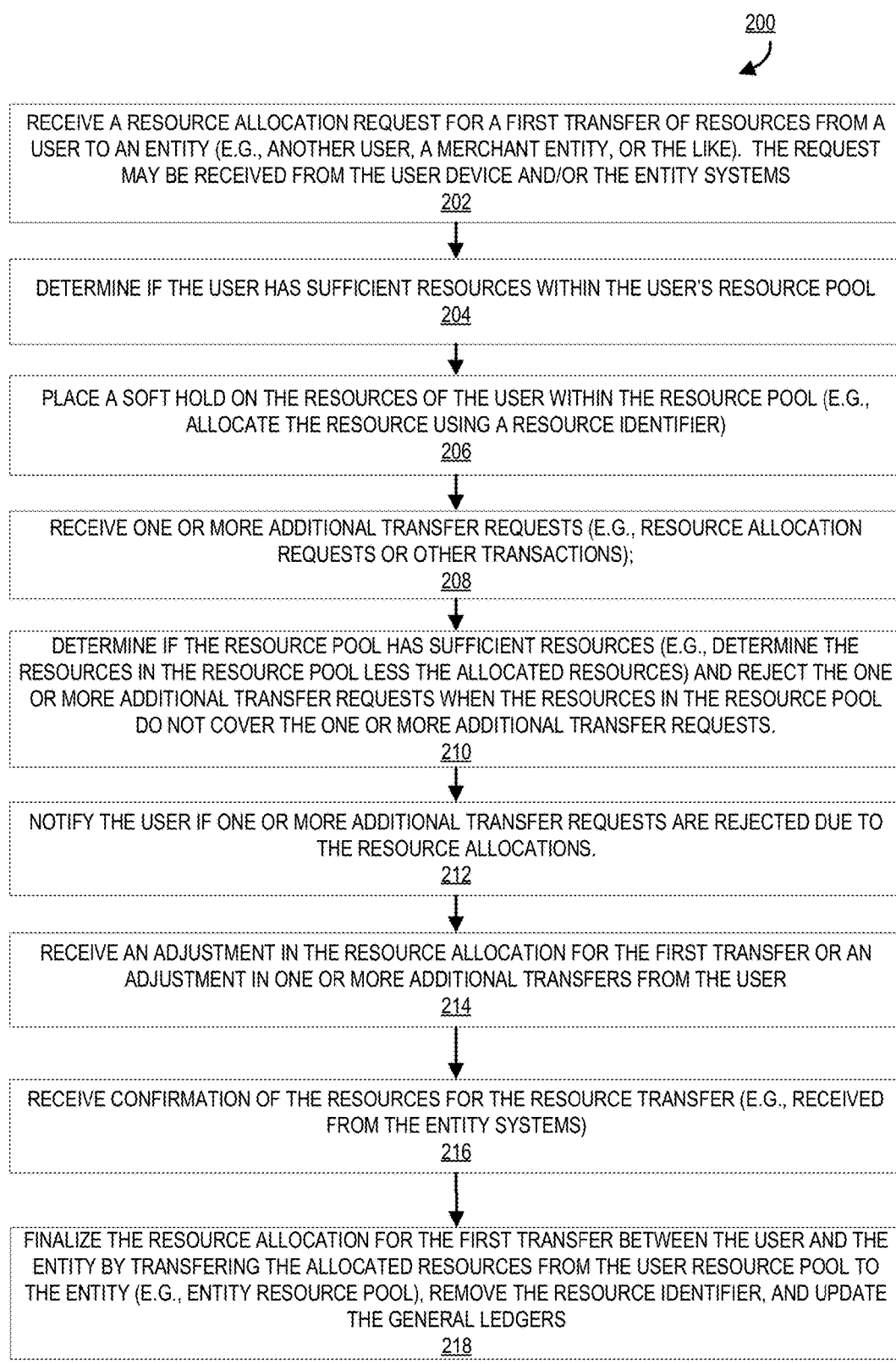
Figure 3:
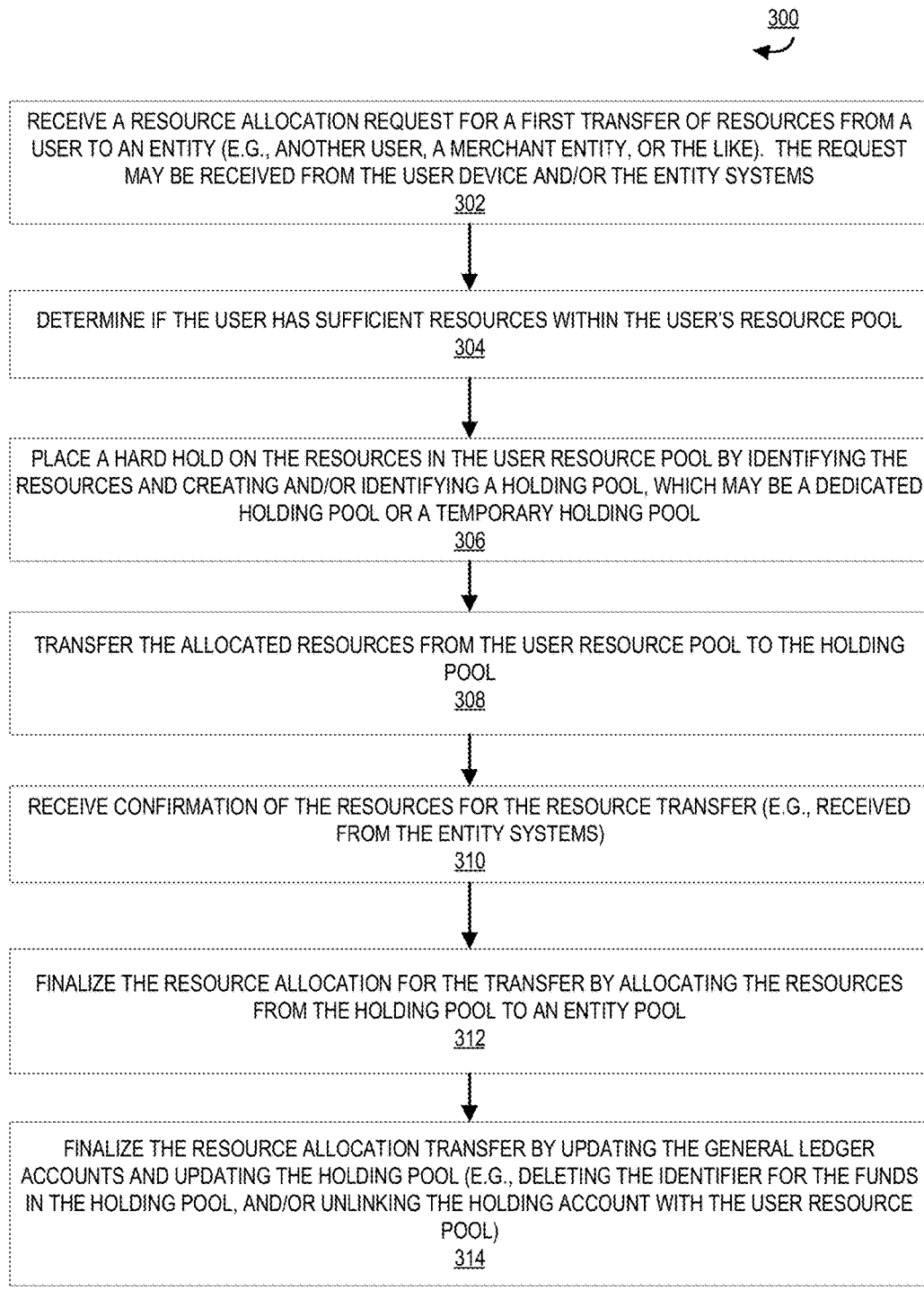
Figure 4:
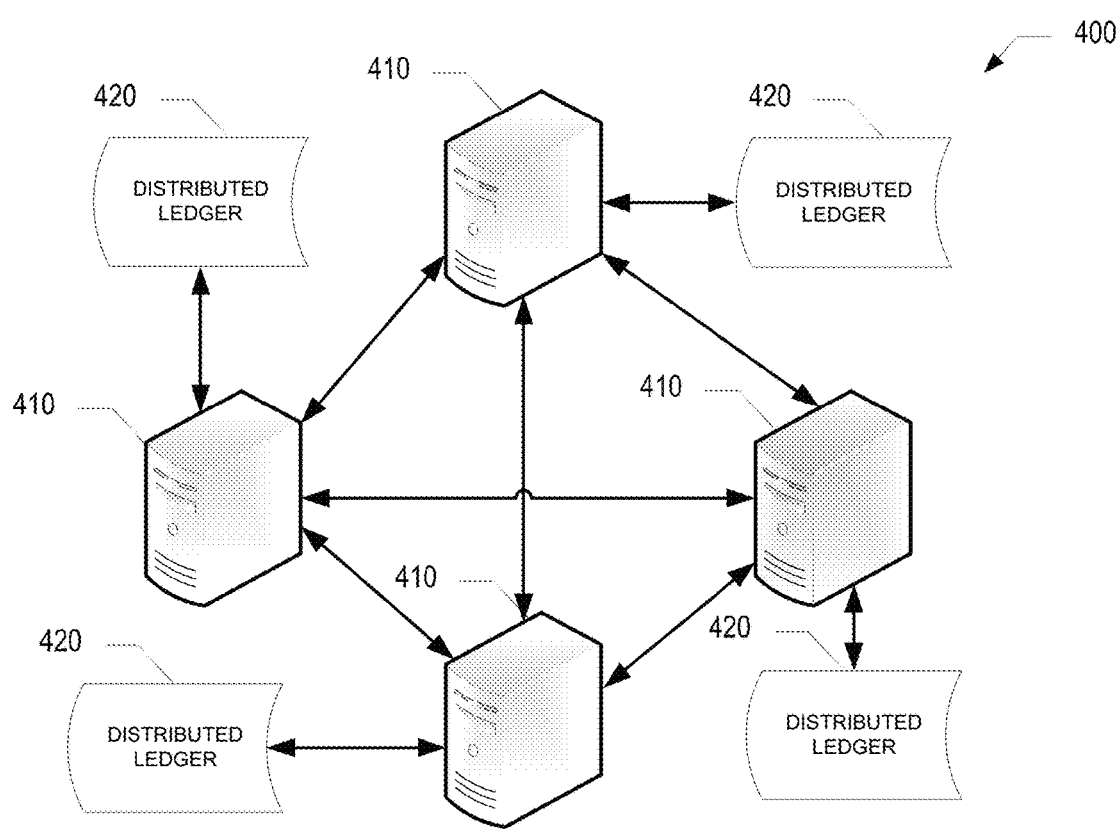

Having thus described embodiments of the invention in general terms, reference will now be made the accompanying drawings, wherein:

FIG. 1 presents a block diagram illustrating a resource allocation and transfer environment, in accordance with aspects of the invention;

FIG. 2 presents a flow diagram for completing an allocation and transfer of resources between entities through the use of a soft hold, in accordance with aspects of the invention;

FIG. 3 presents a flow diagram for completing an allocation and transfer of resources between entities through the use of a hard hold, in accordance with aspects of the invention; and FIG. 4 presents a block diagram illustrating a decentralized block chain network configuration, in accordance with aspects of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" or "associated with" something else, it may be based on or associated with one or more other things as well. In other words, unless expressly indicated otherwise, as used herein "based on" means "based at least in part on" or "based at least partially on," and "associated with" means "associated at least in part with" or "associated at least partially with." Like numbers refer to like elements throughout.

Embodiments of the present invention provide utilizing a distributed network of systems for allocating and transferring resources between entities (e.g., users, institutions, or the like) by providing holds (e.g., soft or hard) on the resources, allocating the resources, and transferring the resources by utilizing allocation identifiers and/or holding pools, if needed. The use of allocation identifiers and/or holds on the resources improves upon the processing speeds and power of systems used for the resource transfers between entities.

FIG. 1 illustrates a resource allocation system environment 100, in accordance with embodiments of the invention. As illustrated in FIG. 1, the environment 100 includes one or more users 104. As will be described herein, the resources may be allocated between and/or by user entities 104 (described herein as users), other entities (e.g., institutional entities, or the like), and/or the like. As such, as described herein a user (e.g., employee, agent, one or more associates, contractors, sub-contractors, third-party representatives, individuals or the like) may affiliated or unaffiliated with an entity, or the like. As described herein a user 104 may take an action or have an entity take an action an action on behalf of the user 104. Moreover, the user 104 or entity associated with the user 104 may enter into transfers with other entities, through the use of resource transfer systems 160 (e.g., systems associated with the entities or third-parties entities used to facilitate the transfers). A user 104 may have resource pools with the one or more resource transfer entities, and as such the user 104 may take an action on the user's resource pool on the user's own behalf, or on an entity pool on behalf of an institutional entity, through the use of the resource transfer entity. As such, as used herein an entity may be an individual working through an entity, an individual working for the entity, a system or device working through the entity, and/or a system or device working for the entity, any other type of entity, or the like. The user 104, entities, systems, or the like described herein may be utilized to make resource allocations and transfers between the users 104, entities, or the systems as described herein.

As illustrated in FIG. 1, the one or more user devices 120 are operatively coupled to the one or more entity systems 140, the resource allocation systems 160, one or more block chain systems 180, or other systems through a network 102, as will be described in detail throughout this application. The network 102 may be a global area network (GAN), such as the Internet, a wide area network (WAN), a local area network (LAN), or any other type of network or combination of networks. The network 2 may provide for wireline, wireless, or a combination of wireline and wireless communication between systems, servers, components, and/or devices on the network 2. It should be understood these devices and systems may be directly or indirectly operatively coupled together depending on the communication occurring between the devices and systems.

As illustrated in FIG. 1, the user 104 may access or utilize the one or more user devices 120 to access or utilize the users' resource pools located at the resource transfer entities, or one or more other entities, to enter into resource transfers with or through the one or more entities using the one or more entity systems 140 and/or resource transfer systems 160. The one or more user devices 120 may be a desktop, laptop, tablet, mobile device (e.g., smartphone device, or other mobile device), or any other type of computer that generally comprises a communication device 122, a processing device 124, and a memory device 126. As used herein, the term "processing device" or "processor" generally includes circuitry used for implementing the communication and/or logic functions of a particular system. For example, a processing device 124 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The processing device 124 may include functionality to operate one or more software programs based on computer-readable instructions 130 thereof, which may be stored in the memory device 126.

The processing device 124 of the one or more user devices 120 is operatively coupled to the communication device 122, and the memory device 126. The processing device 124 uses the communication device 122 to communicate with the network 102 and other devices on the network 102, such as, but not limited to, the one or more entity systems 140, the one or more resource transfer systems 160, the one or more block chain systems 180 (if applicable), or other systems. The communication device 122 generally comprises a wireless transceiver, modem, server, electrical connection, or other component for electronically communicating with other devices on the network 102. The communication device 122 may further include an interface that accepts one or more network interface cards, ports for connection of network components, Universal Serial Bus (USB) connectors, and/or the like. Moreover, the communication device 122 may include a keypad, keyboard, touch-screen, touch-pad, microphone, mouse, joystick, other pointer component, button, soft key, and/or other input/output component(s) for communicating with the users 104.

As illustrated in FIG. 1, the one or more user devices 120 may have computer-readable instructions 130 stored in the memory device 126, which in one embodiment includes the computer-readable instructions 130 of a resource application 132. In some embodiments, the resource application 132 allows the one or more users 104 to manage the users' resource pools held by the one or more resource transfer entities, such as on the resource transfer systems 160; and to transfer resources to one or more other users and/or one or more entities through the one or more entity systems 140 and/or the one or more resource transfer systems 160.

Also illustrated in FIG. 1, the one or more entity systems 140 generally comprise a communication device 142, a processing device 144, and a memory device 146. The processing device 144 is operatively coupled to the communication device 142 and the memory device 146. The processing device 144 uses the communication device 146 to communicate with the network 102 and other devices on the network 102, such as, but not limited to, the one or more user devices 120, the one or more resource transfer systems 160, the one or more block chain systems 180, or other like systems. The communication device 142 generally comprises a wireless transceiver, modem, server, electrical connection, electrical circuit, or other component for electronically communicating with other devices on the network 102. The communication device 142 may further include an interface that accepts one or more network interface cards, ports for connection of network components, Universal Serial Bus (USB) connectors, and/or the like.

As further illustrated in FIG. 1, the one or more entity systems 140 comprise computer-readable instructions 150 stored in the memory device 146, which in one embodiment includes the computer-readable instructions 150 of a resource application 152. In some embodiments, the memory device 146 includes data storage 148 for storing data related to the one or more entity systems 140, including, but not limited to, data created, accessed, and/or used by the resource application 152. In some embodiments, the resource application 152 allows the users 104 and the entities to transfer resources, or allows the entities to transfer resources to other entities. The one or more entities may transfer resources through the entity systems 140 and/or the resource transfer systems 160 associated with the one or more entities or the one or more uses 104.

Also illustrated in FIG. 1, the one or more resource transfer systems 160 generally comprise a communication device 162, a processing device 164, and a memory device 166. The processing device 164 is operatively coupled to the communication device 162 and the memory device 166. The processing device 164 uses the communication device 166 to communicate with the network 102 and other devices on the network 102, such as, but not limited to, the one or more user devices 120, the one or more entity systems 140, the one or more block chain systems 180 (if used), or other like systems. The communication device 162 generally comprises a wireless transceiver, modem, server, electrical connection, electrical circuit, or other component for electronically communicating with other devices on the network 102. The communication device 162 may further include an interface that accepts one or more network interface cards, ports for connection of network components, Universal Serial Bus (USB) connectors, and/or the like.

As further illustrated in FIG. 1, the one or more resource transfer systems 160 comprise computer-readable instructions 170 stored in the memory device 166, which in one embodiment includes the computer-readable instructions 170 of the resource transfer application 172. In some embodiments, the memory device 166 includes data storage 168 for storing data related to the one or more resource transfer systems 140, including, but not limited to, data created, accessed, and/or used by the resource transfer application 172. In some embodiments, the resource transfer application 172 allows the one or more users and one or more entities to transfer resources between each other as needed depending on the processing channels through which the resource transfers are made. In some examples, the resource transfer systems 160 are owned by the one or more entities, and as such, are used to transfer resources to other entities. Alternatively, the one or more resource transfer systems 160 are third party entity systems that utilize one or more channels to transfer the resources 160.

The one or more block chain systems 180 are comprised of the same or similar devices to those contained in the one or more user devices 120, the one or more entity systems 140, and/or the one or more resource transfer systems 160 (e.g., a communication device, a processing device, and a memory device with computer-readable instructions of a transfer application, data storage, or the like), and operates in the same or similar way, with respect to the systems described herein. As such, the block chain system 180 may be utilized to facilitate the resource allocation transfer as will be discussed in further detail with respect to FIG. 4.

FIG. 2 presents a flow diagram for completing resource allocations and transfers utilizing a distributed network 100. As illustrated in FIG. 2 at block 202, an allocation of resources process is begun by receiving a resource transfer request for a transfer of resources (e.g., a first transfer of resources) from a user to an entity (e.g., an entity associated with a first user, a second user, or the like). In one aspect of the invention the user 104 may be an individual, or may be a user acting on behalf of a first entity. The entity may be a second entity or an institution acting on behalf of a second user. As such, the resource transfer may be a transfer between two individual users, may be a transfer between two entities, and/or may be a transfer between a user and an entity. Regardless of the parties involved in the transfer, the resource allocation and transfer described herein may work in the same way. In one example, a user 104 may enter into a transfer with an entity (e.g., a merchant entity), such as a purchase of a product by the user 104 from a merchant entity. In other aspects of the invention, a first user may be transferring resources to a second user through resource allocation entities that hold resource pools for the users (e.g., resource institutions, or the like). The resource allocation may be made between the entities through the use of a resource transfer system 160 (e.g., a system operated by the resource transfer entities, a third party entity that allows for the transfer of resources, or the like).

In one embodiment of the invention, the resource allocation may be related to a purchase of a product (e.g., good or service) by a user 104 from a merchant entity through the use of a user resource pool (e.g., user account) that is held by a resource transfer entity (e.g., a financial institution). The user 104 may purchase the product through the use of a resource instrument, such as but not limited to a negotiable instrument (e.g., check, or the like), through the use of a card (e.g., a credit card, debit card, or the like), or through the use of an electronic payment (e.g., through a phone, or other electronic user device 120), or the like. The user 104 may make the resource request through the entity systems 140, and the entity system 140 may create a request for a resource transfer from the resource transfer systems 160 associated with the user's resource instrument based on the payment option provided by the user 104. As such, the resource transfer request may be received by the resource transfer system 160 from the merchant entity system 140. Additionally, in association with the resource transfer request (e.g., before, at the same time, or after the resource transfer request is made) the user resource transfer systems 160 may receive an allocation request from the user device 120, as will be discussed in further detail later. As such, in some aspects of the invention the resource transfer system 160 may receive the notification of the requested transfer from the entity system 140 and/or the user devices 120.

The issue with some types of resource transfer requests are that they do not always contain the correct resource amount. As such, in some resource transfer requests there is a placeholder resource amount that is initially transferred before the actual resource amount is transferred. For example, when a user 104 enters into a transaction at a gas station entity, the gas station entity may send a placeholder resource amount to the resource transfer entity to identify if the user's resource pool is active (e.g., the user account is active and has resources). Then at a later point in time the gas station will send an actual resource amount to the resource transfer entity to complete the transfer. In another example, when the user 104 enters into a resource transfer with a restaurant entity, the restaurant entity may first make a request for a placeholder resource amount for the amount of the meal because the actual resource amount may be based on the combination of the meal amount and any tip amount. As such, the actual resource amount may be not be sent until well after the original placeholder resource amount is sent. In another example, the user may pay for a product from an entity, or otherwise provide resources to another user, through a negotiable instrument, such as a check. The entity systems 140 may not provide a placeholder and/or actual resource amount associated with the transfer to the resource transfer entity at the time of the transfer (e.g., at the time of the purchase). For example, when a check is provided to a user or an entity the check may be not deposited by the user or entity for hours, days, weeks, or the like.

As such, in some aspects of the invention, the user device 120 may be utilized by the user 104 to send a hold resource amount (e.g., equal to the actual resource amount, or the like) to the resource transfer entity through the resource transfer systems 160 (e.g., the entity holding the user's resource pool). In some aspects of the invention, the user 104 may provide the resource transfer entity the hold resource amount through the use of an online resource application 132 (e.g., an online banking application, or the like). As such, the user 104 may enter the hold resource amount manually, may take and upload a photo of a receipt, may take and upload a photo of a negotiable instrument (e.g., check, or the like), or the like in accordance with the resource transfer. The photos may be captured by a camera associated with the user device 120 (e.g., a camera device operatively coupled to the processing device 124). The user 104 may enter the details associated with the transfer, such as but not limited to, the other user, the merchant entity, the time, the location, the product, or the like manually, such as through the communication device 132 (e.g., speaking into a microphone, typing into a keypad, touchscreen, or the like). In one aspect of the invention, the user 104 may send an electronic receipt for the transfer (e.g., received from the entity) to the resource transfer entity (e.g., resource transfer systems 160). In other aspects of the invention the user device 120 may automatically capture the hold resource amount wirelessly through near field communication, or the like. The resource transfer systems 160 may automatically determine the hold resource amount from the photos, images, electronic receipts, information entered by the user, information captured by the user device 120, or the like by mining the hold resource amount from the communications from the user 104. For example, the resource transfer systems 160 may use optical character recognition of the photo or check to determine the hold resource amount. The resource transfer systems 160 may use data capture from the electronic receipt, such as capturing the total amount paid on a receipt (e.g., combination of meal, tax, and tip). The resource transfer systems 160 may mine the data from the information captured by the near field communication. Alternatively, the resource transfer systems 160 may simply access the hold resource amount entered by the user 104 in a resource application 132. In other aspects, the user device 120 may capture the resource information, such as the hold resource amount, and transfer the information to the resource transfer systems 160 to provide the hold resource amount.

In other aspects of the invention, the details associated with the transfer (e.g., user, merchant, product, transfer number, or the like) may be automatically captured based on a location determining device, or other communication devices 122 in the user devices 120. For example, the location of the user 104 may be determined by a location determining device (e.g., Global Positioning Satellite device, near field communication, or the like), and the location may be used to identity the merchant entity or an identity of the second user (e.g., user based on the proximity of another user at the time of the transfer determined by a location determining device of the second user).

It should be understood that that the hold resource amount and/or other transfer information entered by the user 104 or automatically captured by the user device 120 or resource transfer devices 160 may be utilized to associate the hold resource amount with a particular transfer. For example, the merchant identified by the user 104 may be matched to the resource request received from the same merchant (e.g., before, during, or after the resource hold amount is received from the user 102) in order to match the hold resource amount with the right transfer (e.g., with a placeholder resource amount, or the like). It should be understood that in some aspects of the invention the association may be made automatically, but in other aspects of the invention the user 102 may review a resource transfer list and enter a hold transfer amount for various transfers that may only have a placeholder resource amount.

Block 204 of FIG. 2 illustrates that after the hold resource amount is associated with a transfer, a determination is made that the user requesting the resource allocation has sufficient resources to allocate the resources for the transfer. In some aspects of the invention, the determination of the available resources is made when compared to the hold resource amount received. In some aspects of the invention the determination of the available resources is made when compared to the placeholder resource amount (e.g., an estimated amount from the entity). In some aspects of the invention the resource transfer systems 160 will not verify the resources in the resource pool until the resource transfer systems 160 receive the hold resource amount from the user 104. For example, the resource transfer systems 160 may know from information provided by the entity if a transfer request includes a placeholder resource amount or an actual resource amount. Once the resource transfer system 160 has the hold resource amount received from the user 102, the resource transfer systems 160 verify that the user resource pool has resource amounts that would cover the hold resource amount for the resource transfer.

FIG. 2 further illustrates in block 206, that the resource transfer systems 160 may place a soft hold on the account of the user 104 for the hold resource amount. In some aspects of the invention the soft hold includes allocating the resources within the user's resource pool. For example, the resources within the user's resource pool may be set aside using an allocation identifier that is attached to the resources that would cover the hold resource amount. For example, the resources that cover the hold resource amount would be tagged with the allocation identifier, and the allocation identifier may indicate the transfer for which the resources are allocated. For example, the allocation identifier may include a transfer number, merchant, user, location, product, or the like. The allocation identifier tagged to the allocated resources prevents allowing the allocation resources to be utilized for another transfer by making the allocated resources with the allocation identifier unavailable for additional transfers. For example, when detecting the resource amounts in the user resource pool the resources tagged with an allocation identifier are not calculated. In another example, the allocated resources may be ghost resources in that they are not included in total amount in the resource pool, but still remain in the resource pool.

Block 208 illustrates that the resource transfer systems 160 may receive additional resource transfer requests associated with additional transfers (e.g., additional transactions, such as purchases, payments, or the like). These additional requests may include either an actual resource amount, a placeholder resource amount, and/or hold resource amount. As such, these requests may be transfers that can be completed or may be transfers that require the actual resource amount to be received before the transfer can be completed. As previously discussed with respect to block 202 the requests are receive from one or more entity systems 140 (e.g, merchant systems, or the like) associated with the one or more entities (e.g., merchants, or the like), or from resource transfer entities associated with the one or more entities (e.g., merchants, or the like) through the resource transfer systems 160.

Block 210 of FIG. 2 illustrates that the resource transfer systems 160 determine if there are sufficient resource amounts in the resource pool of the user to complete the one or more additional transfer requests. This determination may include not only identifying if the amount of resources in the user resource pool is greater than the resources associated with the additional one or more requested transfers, but may also take into the account the allocated resources amounts within the resource pools (e.g., the resource amounts that have been allocated for a transfer based on the soft hold, such as through the use of allocation identifiers). As such, while the amount of total resources in the resource pool may cover the additional one or more resource transfer requests, the amount of resources in the resource pool less the amount of allocated resources may not cover the one or more additional resource transfer request. As such the one or more additional transfers may be rejected, or marked for future rejection (e.g., as described below the user may be notified to make changes to the allocated resources) by the resource transfer systems 160. For example, if the second resource amount for a second resource transfer request is greater than the resource amount in the resource pool less the allocated resources amount (e.g., a hold resource amount that has been converted to an allocated resource amount through an allocation identifier), then the resource transfer request may be rejected (or otherwise prevented from occurring at the particular time). Alternatively, if the second resource amount for a second resource transfer request is less than the resource amount in the resource pool less the allocated resources, then the resource transfer request may be allowed (or otherwise the resources may be allocated as second allocated resources for future completion of the second resource transfer).

FIG. 2 further illustrates in block 212 that the resource transfer system 160 may notify the user 104 if any additional resource transfer requests have been rejected based on the allocated resources, in order to allow the user to manage the resource allocation and transfer of the resources in the user's resource pool. The notification may be any type of communication with the user 104, such as but not limited to a phone call, text message, e-mail, sound alert, color alert, or the like on the user device 120 (or another device) in order to notify the user 104 that one or more additional resource transfer requests may be rejected because of the user's allocated resources in the resource pool.

As illustrated by block 214 in FIG. 1, after being notified of the rejection, or potential rejection (e.g., additional resource transfer request is marked for future rejection), of one or more additional resource transfer requests, the user 104 may be able to adjust the resource allocations in the resource pool. For example, the user 104 may know that the allocated resources will not be transferred for a period of time (e.g., days, weeks, months, or the like), as such, the user may adjust the resource allocation (e.g., delete, alter to a future point in time, reduce the amount, or the like) in order to allow one or more of the additional resource transfer requests to occur. In another example, the user 104 may request that the one or more additional resource transfer requests be accepted (e.g., instead of being deleted) when the user is aware of additional resources that will be added to the resource pool in order to cover the one or more additional resource transfer requests (e.g., the user 104 knows a deposit will be entered into the resource pool). As such, the user 104 may accept an immediate resource transfer, or allow a previously rejected resource allocation, while deleting a previously entered resource allocation or requesting moving the resource allocation to the future (e.g., automatically re-allocate the resources after the user receives a paycheck or otherwise has enough resources in the user resource pool).

Block 216 illustrates that the allocated resources in the resource pool will remain allocated until the resource transfer systems 160 receive confirmation from the entity systems 140, or other resource transfer system 160 associated with the entity, that the allocated resource amount for the resource transfer is correct. For example, the entity may provide the actual resource amount to the resource transfer entity, and the resource transfer entity compares the actual resource amount received to the allocated resource amount. If they are the same the resource transfer may be completed. If they are different the resource transfer will complete the transfer if the actual resource amount is less than the allocated resource amount. If the actual resource amount is greater than the allocated resource amount, the resource transfer entity will determine if there are enough resources in the resource pool to complete the transfer. If there are enough resources in the resource pool, then the transfer will be completed. If there are not enough resources in the resource pool to cover the additional amount of the actual resource amount than the resource transfer entity may notify the user, delay the transfer, reject the transfer, or the like. In other aspects of the invention, in some instances when the actual resource amount is greater than the allocated resource amount the resource transfer systems 160 may notify the user for approval of the actual resource amount before completing the resource transfer.

Block 218 illustrates that when the resource transfer is completed, the allocated resources (e.g., the resources subject to the soft hold) are transferred out of the resource pool of the user 104 to a destination pool (e.g., the entity resource pool, a second user resource pool, or the like). The allocation identifier associated with the allocation resources that are subject to the soft hold is removed and/or eliminated. The general ledgers of the resource pools are updated and the resource transfer details are saved for bookkeeping (e.g., through the block chain as will be described later, or the like).

FIG. 3 illustrates a resource allocation process 300 in which a hard hold is used to allocate the resources for the transfer. As illustrated by block 302 in FIG. 3 the resource transfer systems 160 receive a resource transfer request to transfer resources from a user 104 to an entity (e.g., another user, a user associated with an entity, a merchant entity, or the like). The resource transfer request is received in the same way as previously discussed with respect to block 202 of FIG. 2. As such, the resource request may come from entity systems 140 and the resource transfer request may be supplemented with a hold resource amount from the user 104 through the user devices 102. Moreover, as previously discussed the resource transfer request may result from the use of resource instrument, such as but not limited to a negotiable instrument (e.g., check, or the like), through the use of a card (e.g., a credit card, debit card, or the like), or through the use of electronic payment (e.g., through a phone, or other electronic user device 120), or the like.

Block 304 of FIG. 3 illustrates that the resource transfer systems 160 determine if the user and/or entity requesting the resource transfer has sufficient resources to enter into the resource transfer, as previously discussed with respect to block 204 in FIG. 2. As previously discussed above, the resource transfer systems 160 may check the user resource pool to determine if the user has the resource amounts that would cover the hold resource amount received from the user 104.

Block 306 of FIG. 3 illustrates that if there are sufficient resource amounts in the resource pool of the user 104, the resource transfer systems 160 will place a hard hold on the resource amounts in the resource pool of the user 104. In some aspects of the invention, the holding pool may be created and/or assigned by the resource transfer systems 160 to the user resource pool. As such, the holding pool (e.g., holding account, or the like) may be a new resource pool automatically set up by the resource transfer systems 160, or may be a holding pool that has been already created and assigned to the user resource pool. The holding pool may be linked to the resource pool of the user, such that only resources from the resource pool of the user may be transferred into the holding pool. It should be understood one or more dedicated holding pools and/or one or more temporary holding pools may be utilized for one or more resource transfers.

The one or more dedicated holding pools may always be associated with the resource pool of the user, such that any resources that are allocated are transferred to the one or more dedicated holding pools of the user (or one or more of dedicated holding pools for various types of transfers). In some aspects of the invention, all of the allocated resources may be transferred to a single dedicated holding pool. Alternatively, the user 104 and/or resource transfer entity may dictate to which dedicated holding pool an allocated resource transfer may be made. For example, the resource transfer entity may transfer specific allocated resources to specific dedicated holding pools in order to improve the processing of the resource transfers. In one aspect, the resource transfer entity may allocate the resources to different holding pools based on region (e.g., city, state, groups of states, groups of areas across states, countries, groups of countries, or the like), based on type of entity to which the transfer is made (e.g., type of merchant, type of financial institution, type of user, or the like), based on the resource transfer amount (e.g., small amount vs. large), or the like.

In other aspects of the invention the holding pool may be a temporary holding pool that is only linked to the user's resource pool for one or more specific transfers. As such, the temporary holding pool may be unlinked and/or deleted after completion of the one or more transfers, and may be utilized again with the same user or a different user for a different transfer. For example, the resource transfer systems 160 may have a desired number of temporary holding pools to cover the likely amount of resource transfers that require resource allocations. The temporary holding pools may be linked with the user resource pools as the requests for resource transfers are made against the resource pools of the various users 104. The temporary holding pools are used for specific transfer of resources and may be assigned in the same ways the dedicated holding pools may be assigned, as discussed above.

The resource transfer entity may utilize the one or more dedicated holding pools and/or temporary holding pools to speed up the resource transfers by pre-allocating the resources such that when the confirmation of the transfer is received (e.g., from the entity systems 140 or the resource transfer systems 160 associated with the entity) the transfer may be made and the resource transfer systems 160 are not required to check the user's resource pool to determine if the user 104 has the available funds. As such, the resource transfer systems 160 may only have to inquire as to the resources in the resources transfer pools of the users 104 once (e.g., when the initial transfer is requested and the user 104 provides the resource hold amount). This process greatly reduces the processing times and computer power needed for processing the transfers received that only have a placeholder resource amount provided, which would require multiple checks of the resources in the resource pool (e.g., when the initial placeholder resource amount is provided and when the actual resource amount is confirmed by the entity).

The user 104 may also utilize the holding pools to improve upon the user's management of the user's resources. As such, the user 104 may be able to better enter into resource transfers knowing the resource amounts that the user 104 actually has in the user resource pool (e.g., resource amounts less the allocated resources). In this way the user 104 is less likely to make a transfer that would be rejected by the resource transfer systems 160.

Block 308 of FIG. 3 illustrates that the allocated resources from the user resource pool are transferred to the holding pool (e.g., the temporary holding pool in some cases and the dedicated holding pool in other cases). As such, the allocated resources have been moved to another pool (e.g., holding pool). In some aspects of the invention the user 104 may decide when to allocate the resources and when not to allocate the resources. For example, the user 104 may or may not want to take advantage of the holding pools depending on the type of transfer. As examples, the user 104 may know that the resources associated with a transfer are small and may not require the transfer to the holding pool. In other examples, the user 104 may know that the transfer may not occur for a period of time (e.g., days or weeks) and as such the user 104 does not want to tie up the resources in a holding pool. In some aspects of the invention, the user 104 may be able to move the allocated resources between pools as the user 104 desires. However, in other aspects of the invention once the resources are transferred to the holding pool the user 104 may only be able to access the allocated resources if the transfer is canceled (e.g., the negotiable instrument is voided, the credit card purchase is voided, the purchase is returned, or the like).

Block 310 illustrates that after the allocated resources are transferred to the holding pool the resource transfer systems 160 wait until the transfer is confirmed, as previously discussed with respect to block 216 in FIG. 2. In some examples, this may include waiting until receiving the negotiable instrument, an image of the negotiable instrument, the actual resource amount from the entity, or the like. For example, in one embodiment the resource transfer systems 160 will hold the resources in the holding pool until the resource transfer systems 160 receive confirmation that the physical negotiable instrument (or image of the physical negotiable instrument) has been received and the actual resource amount on the negotiable instrument is correct. In other examples, the resource transfer systems 160 hold the allocated resources in the holding pool until the actual resource amount associated with the transfer is verified by the entity requesting the resource transfer. For example, gas purchases may initially illustrate the placeholder resource amount (or the holding resource amount) until the entity provides the actual resource amount at a later point in time. In another example, a restaurant amount may not include a tip, and thus the placeholder resource amount (or the holding resource amount) is held until the actual resource amount is received from the restaurant.

The resource transfer systems 160 may finalize the transfer by transferring the allocated resources in the holding account to the destination pool (e.g., entity resource pool, or the like), as illustrated by block 312 in FIG. 3. For example, the destination pool may be an entity resource pool associated with the institution involved in the resource transfer request, or an entity resource pool associated with a second user involved in the resource transfer request (e.g., second user resource pool), or the like.

Block 314 in FIG. 3 illustrates that the resource transfer is finalized by editing the general ledger accounts of the user resource pool, the holding pool, and the destination pool (e.g., entity resource pools). Moreover, depending on the type of holding account, finalizing the resource allocation may include removing the holding pool, such as unlinking the holding pool with the resource pool of the user, deleting the holding pool (and thus unlinking), reassigning the holding pool to another transfer (e.g., another user resource pool for another transfer), or the like. In the aspects in which the holding pool is a dedicated pool for the user, the general ledger of the allocated resources in the dedicated resource pool may be adjusted (e.g., because there may be multiple allocated resources in the dedicated resource pool), and the allocation identifier for the allocated resources may be deleted (e.g., because there may be multiple allocation identifiers within the dedicated holding pool).

It should be understood that in some aspects of the invention the resource transfer systems 160 may utilize both a soft hold and hard hold (e.g., a hybrid hold) for different and/or the same transfers requests. For example, a user 104 may request a soft hold for a particular types of transfers, while requesting a hard hold for other types of transfers, or utilizing both soft and hard holds for other types of transfers. In one example, a dedicated holding pool may be linked with the user's resource pool (e.g., for hard holds), and the allocation identifier for the different types of allocated resources within the holding pool may be used (e.g., for soft holds within the hard hold pool).

In one aspect of the invention, the resource allocation and transfer may be implemented through the use of a block chain, using the block chain systems 180. FIG. 4 provides one example of a block chain system diagram, illustrating how a block chain operates. Rather than utilizing a centralized database to access, view, store, disseminate, and/or validate information, the present invention may be implemented through a decentralized block chain configuration or architecture, as shown in FIG. 4. The decentralized block chain allows users to access, view, store, disseminate, and/or validate information, or take another action related to an event (e.g., resource allocation and transfer, or the like). Such a decentralized block chain configuration ensures accurate mapping and validation of event information, and provides a secured network over which information may be validated. Accordingly, block chain configurations may be utilized with respect to any type of information, such as, but not limited to maintaining an accurate ledger of information, such as resource allocation and transfer information (e.g., transaction, asset transfer, sale, or other like transfer of value and/or information), personal information, credit history information, or the like, in order to provide validation, such as validation of resource allocation, or access to personal information, or the like.

A block chain (otherwise described herein as a "blockchain") is a distributed database that maintains a list of data records, the security of which is enhanced by the distributed nature of the block chain. A block chain typically includes several nodes, which may be one or more entities, systems within an entity, machines, computers, databases, data stores, or the like operably connected with one another. For example, the various systems and devices (or at least some of the systems and devices, such as the user devices 120, the entity systems, or the resource transfer systems 160) described with respect to FIG. 1, or devices or systems within the systems described with respect to FIG. 1 (e.g., various systems within the entity systems 140 and/or resource transfer systems 160) may be nodes. In some aspects of the invention, an entity may be a node of a block chain, and internal or external block chain users (e.g., miners as discussed in further detail later) may access the entity systems in order to take actions with respect to an event. In other aspects of the invention various systems within an entity may be nodes, which may or may not be grouped together and associated with the entity. In other aspects of the invention, each of the nodes or multiple nodes are maintained by different entities, or components within an entity, and as such different systems within an entity or between entities may act as nodes. In other aspects each of the user devices 120 may be nodes, and each of the user devices 120 may be associated with an entity. As such, the block chain may be controlled by a single entity or multiple entities. A block chain typically works without a central repository or single administrator. One application of a block chain is the public ledger of resource transfers for cryptocurrencies, such as used in bitcoin. In this use of a block chain, the data records recorded in the block chain are enforced cryptographically and stored on the nodes of the block chain.

A block chain provides numerous advantages over traditional databases. For example, with respect to utilizing a block chain for resource allocation and transfers, a large number of nodes of a block chain may reach a consensus regarding the validity of a resource allocation and transfer contained on a decentralized ledger. Similarly, when multiple versions of a document or resource allocation and transfer exists on the ledger, multiple nodes can converge on the most up-to-date version of the resource allocation and transfer. For example, in the case of a virtual currency resource allocation and transfer, any node within the block chain that stores or validates the resource allocation and transfer, can determine within a level of certainty whether the resource allocation and transfer can take place and become final by confirming that no conflicting resource allocations and transfers (e.g., the same currency unit has not already been spent) are confirmed by the block chain elsewhere on other nodes.

The block chain typically has two primary types of records. The first type is the transfer type, which consists of the actual data stored in the block chain. The second type is the block type, which are records that confirm when and in what sequence certain transfers became recorded as part of the block chain. Transfers are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria. In some block chain systems, miners are incentivized to create blocks by a rewards structure that offers a pre-defined per-block reward and/or fees offered within the transactions validated themselves. Thus, when a miner successfully validates a transfer on the block chain, the miner may receive rewards and/or payments as an incentive to continue creating new blocks.

As mentioned above and referring to FIG. 4, a block chain 400 is typically decentralized—meaning that a distributed ledger 420 (e.g., a decentralized ledger) is maintained on multiple nodes 410 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains may be developed. These include distributed domain name management, decentralized crowd-funding, contract execution, analyst reporting, financial reporting, synchronous/asynchronous communication, decentralized real-time ride sharing, controlling access to or dissemination of timeline, personal, and/or financial data (e.g., a credit report, or the like) and even a general purpose deployment of decentralized applications. As such, block chains may be utilized to access, view, store, create, disseminate, and/or validate any type of event information, or take any other type of action with respect to event information associated with an event.

In one embodiment, a block chain may be utilized for resource allocations between a user 104 and an entity, through the use of the user devices 120, the entity systems 140, and the resource transfer systems 160. The block chain systems 180 may be used to allocate and transfer resources. As discussed above with respect to FIGS. 2 and 3, the information related to the transfer requests, allocated resources, holding pools, or the like may be made through the use of the block chain environment 400. For example, the steps in FIGS. 2 and 3, or reference to each, may be stored in the block chain environment as they are performed.

Moreover, it should be understood that the process flows described herein include transforming the information sent and/or received from the applications of the different systems (e.g., internally or externally) from one or more data formats into a data format associated with the other applications and systems (including in some cases the block chain application). There are many ways in which information is converted within the system environment 100 and/or the block chain environment 400. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It should be understood that in some aspects of the invention the user described herein may be a customer, the entity may be a merchant, the resource transfer entity may be a financial institution, the resource pools may be accounts (e.g., a user account, a merchant account), the transfer may be associated with a transaction, and the resources may be funds that are allocated and transferred based on the parties entering into the transfer. It should be understood that the resources in other embodiments of the invention may be resources that are not funds, and instead are other types of resources that may be transferred between parties.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, allocations and the like.

In accordance with embodiments of the invention, an "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. The term "resource" or "funds" includes forms of currency or payment stored by a financial institution in an account.

It should be understood that "operatively coupled," when used herein, means that the components, systems, devices, or the like may be formed integrally with each other, or may be formed separately and coupled together. Furthermore, "operatively coupled" means that the components, systems, devices, or the like may be formed directly to each other, or to each other with one or more components, systems, devices, or the like located between the components, systems, devices, or the like that are operatively coupled together. Furthermore, "operatively coupled" may mean that the components, systems, devices, or the like are detachable from each other, or that they are permanently coupled together.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for facilitating electronic resource allocation and resource transfer between a user and an entity through the use of a distributed network of systems, the system comprising:
    one or more memory devices storing computer-readable code; and
    one or more processing devices operatively coupled to the one or more memory devices, wherein the one or more processing devices are configured to execute the computer-readable code to:
        electronically receive a transfer request for resources from the user to the entity, wherein the transfer request for the resource transfer is received from an entity system associated with the entity, and wherein the transfer request from the entity includes a placeholder resource amount;
        electronically receive an allocation request from the user related to the transfer request, wherein the allocation request is received from a user device, and wherein the allocation request includes an allocated resource amount for the transfer request;
        electronically determine when a user resource pool has resource amounts that satisfy the allocated resource amount for the resource transfer;
        electronically place a hold on the resource amounts in the user resource pool by identifying the resource amounts as allocated resources, wherein the hold is a hard hold, wherein the allocated resources are transferred from the user resource pool to a holding pool, and wherein the user resource pool and the holding pool are located with the same financial institution;
        electronically receive confirmation of an actual resource amount for the resource transfer, wherein the confirmation is received from the entity system or resource transfer system; and
        electronically finalize the resource transfer when the allocated resource amount covers the actual resource amount by transferring the allocated resources to an entity resource pool, wherein the allocated resources are transferred through the entity system or the resource transfer system.

2. The system of claim 1, wherein the holding pool is a dedicated holding pool linked with the user resource pool and wherein the one or more processing devices are configured to execute the computer-readable code to:
    electronically associate an allocation identifier with the allocated resources in the holding pool, wherein the allocation identifier at least includes the allocated resource amount for the resources for the transfer request; and
    wherein finalizing the resource transfer comprises transferring the allocated resources from the holding pool to the entity resource pool and deleting the allocation identifier.

3. The system of claim 1, wherein the holding pool is a temporary holding pool and wherein the one or more processing devices are configured to execute the computer-readable code to:
    electronically create the temporary holding pool;
    electronically link the temporary holding pool with the user resource pool;
    electronically transfer the allocated resources from the user resource pool to the temporary holding pool; and
    wherein finalizing the resource transfer includes transferring the allocated resources from the temporary holding pool to the entity resource pool and unlinking the temporary holding pool or deleting the temporary holding pool.

4. The system of claim 1, wherein the allocated resources transferred from the user resource pool to the holding pool is a permanent transfer unless the transfer request is canceled.

5. The system of claim 1, wherein the allocated resources transferred from the user resource pool to the holding pool is a revocable transfer.

6. The system of claim 1, wherein the one or more processing devices are configured to execute the computer-readable code to:
    electronically determine when the allocated resource amount is less than the actual resource amount;
    electronically determine when at least a portion of the resources in the user resource pool and the allocated resources satisfies the actual resource amount; and
    electronically transfer at least the portion of the resources in the user resource pool and the allocated resources to the entity resource pool.

7. The system of claim 1, wherein the one or more processing devices are configured to execute the computer-readable code to:
    electronically determine when the allocated resource amount is less than the actual resource amount;
    electronically determine when at least a portion of the resources in the user resource pool and the allocated resources do not satisfy the actual resource amount; and
    electronically cancel the transfer request.

8. The system of claim 1, wherein when the allocated resource amount is greater than the actual resource amount the difference is returned to the user resource pool.

9. A method for facilitating electronic resource allocation and resource transfer between a user and an entity through the use of a distributed network of systems, the method comprising:

electronically receiving, by one or more processing devices, a transfer request for resources from the user to the entity, wherein the request for the resource transfer is received from an entity system associated with the entity, and wherein the transfer request from the entity includes a placeholder resource amount;

electronically receiving, by the one or more processing devices, an allocation request from the user related to the transfer request, wherein the allocation request is received from a user device, and wherein the allocation request includes an allocated resource amount for the transfer request;

electronically determining, by the one or more processing devices, when a user resource pool has resource amounts that satisfy the allocated resource amount for the resource transfer;

electronically placing, by the one or more processing devices, a hold on the resource amounts in the user resource pool by identifying the resource amounts as allocated resources, wherein the hold is a hard hold, wherein the allocated resources are transferred from the user resource pool to a holding pool, and wherein the user resource pool and the holding pool are located with the same financial institution;

electronically receiving, by the one or more processing devices, confirmation of an actual resource amount for the resource transfer, wherein the confirmation is received from the entity system or resource transfer system; and electronically finalize the resource transfer when the allocated resource amount covers the actual resource amount by transferring the allocated resources to an entity resource pool, wherein the allocated resources are transferred through the entity system or the resource transfer system.

10. The method of claim 9, wherein the holding pool is a dedicated holding pool linked with the user resource pool and wherein the method further comprises:
electronically associating, by one or more processing devices, an allocation identifier with the allocated resources in the holding pool, wherein the allocation identifier at least includes the allocated resource amount for the resources for the transfer request; and
wherein finalizing the resource transfer comprises transferring the allocated resources from the holding pool to the entity resource pool and deleting the allocation identifier.

11. The method of claim 9, wherein the holding pool is a temporary holding pool and wherein the method further comprises:
electronically creating, by the one or more processing devices, the temporary holding pool;
electronically linking, by the one or more processing devices, the temporary holding pool with the user resource pool;
electronically transferring, by the one or more processing devices, the allocated resources from the user resource pool to the temporary holding pool; and
wherein finalizing the resource transfer includes transferring the allocated resources from the temporary holding pool to the entity resource pool and unlinking the temporary holding pool or deleting the temporary holding pool.

12. The method of claim 9, wherein the allocated resources transferred from the user resource pool to the holding pool is a permanent transfer unless the transfer request is canceled.

13. The method of claim 9, wherein the allocated resources transferred from the user resource pool to the holding pool is a revocable transfer.

14. The method of claim 9, further comprising:
electronically determining, by the one or more processing devices, when the allocated resource amount is less than the actual resource amount;
electronically determining, by the one or more processing devices, when at least a portion of the resources in the user resource pool and the allocated resources satisfies the actual resource amount; and
electronically transferring, by the one or more processing devices, at least the portion of the resources in the user resource pool and the allocated resources to the entity resource pool.

15. The method of claim 9, further comprising:
electronically determining, by the one or more processing devices, when the allocated resource amount is less than the actual resource amount;
electronically determining, by the one or more processing devices, when at least a portion of the resources in the user resource pool and the allocated resources do not satisfy the actual resource amount; and
electronically canceling, by the one or more processing devices, the transfer request.

16. The method of claim 9, herein when the allocated resource amount is greater than the actual resource amount the difference is returned to the user resource pool.

17. A computer program product for facilitating electronic resource allocation and transfer between a user and an entity through the use of a distributed network of systems, the computer program product comprising at least one non-transitory computer-readable medium having computer-readable program code portions embodied therein, the computer-readable program code portions comprising:
an executable portion configured to electronically receive a transfer request for resources from a user to an entity, wherein the request for the resource transfer is received from an entity system associated with the entity, and wherein the transfer request from the entity includes a placeholder resource amount;
an executable portion configured to electronically receive an allocation request from the user related to the transfer request, wherein the allocation request is received from a user device, and wherein the allocation request includes the allocation resource amount for the transfer request;
an executable portion configured to electronically determine when a user resource pool has resource amounts that satisfy the allocated resource amount for the resource transfer;
an executable portion configured to electronically place a hold on the resources in the user resource pool by identifying the resources as allocated resources, wherein the hold is a hard hold, and wherein the allocated resources are transferred from the user resource pool to a holding pool, and wherein the user resource pool and the holding pool are located with the same financial institution;
an executable portion configured to electronically receive confirmation of the actual resource amount for the resource transfer, wherein confirmation is received from the entity systems or resource transfer systems; and
an executable portion configured to electronically finalize the resource transfer when the allocated resource amount covers the actual resource amount by transferring the allocated resources to an entity resource pool, wherein the allocated resources are transferred through the entity systems or the resource transfer systems.

18. The computer program product of claim 17, wherein the holding pool is a dedicated holding pool linked with the user resource pool and wherein the computer-readable program code portions further comprise:

an executable portion configured to electronically associate an allocation identifier with the allocated resources in the holding pool, wherein the allocation identifier at least includes the allocated resource amount for the resources for the transfer request; and wherein finalizing the resource transfer comprises transferring the allocated resources from the holding pool to the entity resource pool and deleting the allocation identifier.

19. The computer program product of claim 17, wherein the holding pool is a temporary holding pool and wherein the computer-readable program code portions further comprise:

an executable portion configured to electronically create the temporary holding pool;

an executable portion configured to electronically link the temporary holding pool with the user resource pool;

an executable portion configured to electronically transfer the allocated resources from the user resource pool to the temporary holding pool; and wherein finalizing the resource transfer includes transferring the allocated resources from the temporary holding pool to the entity resource pool and unlinking the temporary holding pool or deleting the temporary holding pool.

* * * * *